United States Patent [19]
van der Lely

[11] Patent Number: 4,576,394
[45] Date of Patent: Mar. 18, 1986

[54] TRACTOR

[76] Inventor: Cornelis van der Lely, 7 Brüschenrain, Zug, Switzerland

[21] Appl. No.: 527,682

[22] Filed: Aug. 30, 1983

[30] Foreign Application Priority Data

Aug. 31, 1982 [NL] Netherlands .................. 8203382

[51] Int. Cl.⁴ .............................................. B60D 1/00
[52] U.S. Cl. ................... 280/490 A; 180/255; 180/900
[58] Field of Search .......... 280/490 R, 490 A, 461 A, 280/460 A; 180/900, 255; 172/439

[56] References Cited

U.S. PATENT DOCUMENTS

| | | | |
|---|---|---|---|
| 2,928,487 | 3/1960 | Bobard | 180/255 |
| 3,318,529 | 5/1967 | Ferm et al. | 239/69 |
| 4,057,265 | 11/1977 | Grace | 280/490 R |
| 4,124,079 | 11/1978 | Crow | 180/900 X |
| 4,131,170 | 12/1978 | van der Lely | 180/900 X |
| 4,164,985 | 8/1979 | Bobard | 180/900 X |

FOREIGN PATENT DOCUMENTS

| | | |
|---|---|---|
| 1457776 | 4/1971 | Fed. Rep. of Germany . |
| 2622444 | 12/1977 | Fed. Rep. of Germany . |
| 1135891 | 3/1965 | United Kingdom . |

*Primary Examiner*—John A. Pekar
*Attorney, Agent, or Firm*—Penrose Lucas Albright

[57] ABSTRACT

A tractor comprises a lifting device and two driven front sets of wheels which are power driven and steerable about a common axis. Each front set of wheels has two side-by-side front wheels driven by a kingpin which extends between them. Front of the front wheels is a lifting device comprising three coupling points which are movable together up and down along a straight guide. Such guide is pivotable about a horizontal axis.

20 Claims, 4 Drawing Figures

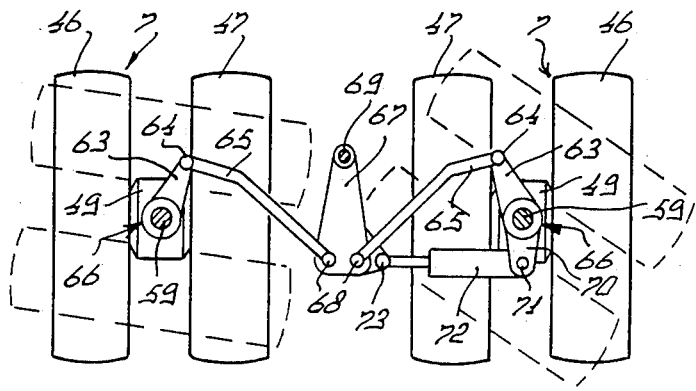
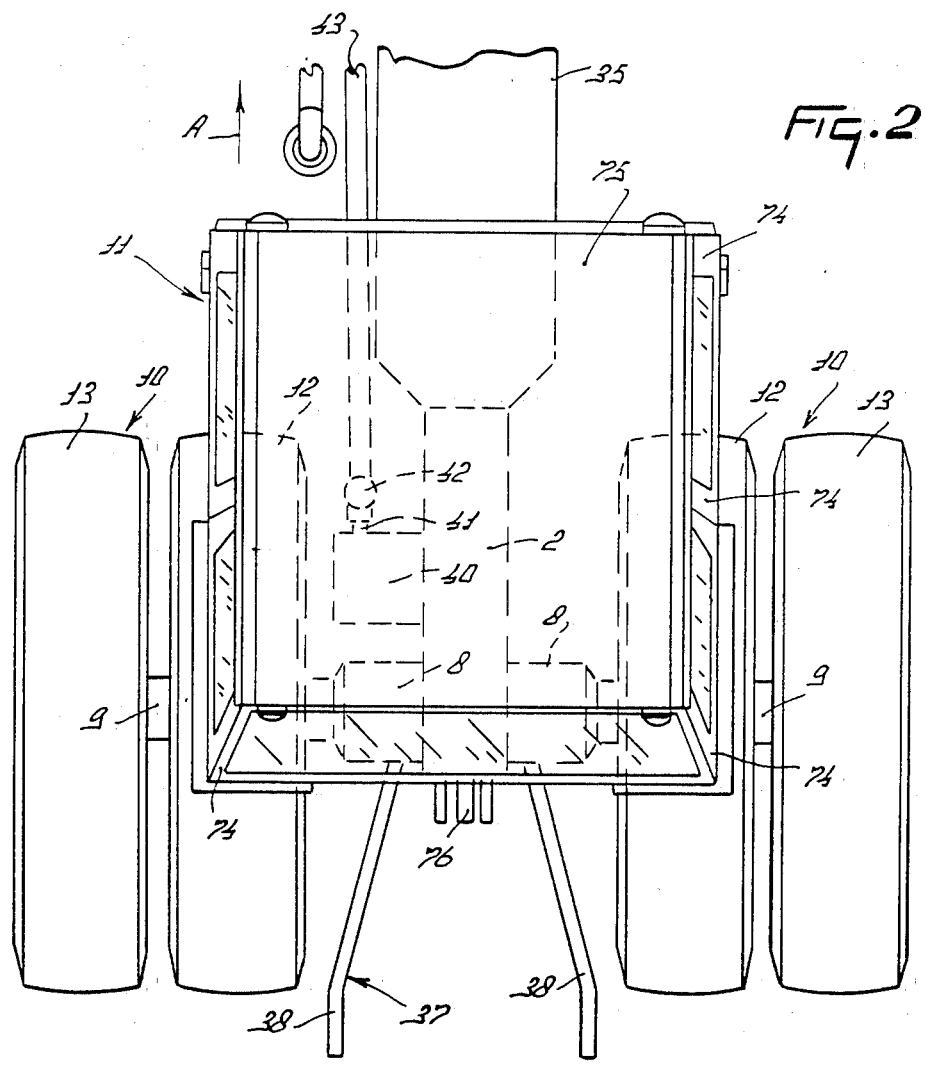
FIG. 2

TRACTOR

SUMMARY OF THE INVENTION

This invention relates to agricultural tractors.

Existing tractors have the disadvantage that, when agricultural implements are lifted by the lifting device of the tractor, the soil structure in the tracks is adversely affected by the weight of the tractor to such an extent that crop in the tracks is stunted in comparison that on the rest of the field.

It is an object of the invention to mitigate this disadvantage as much as possible.

According to one aspect of the present invention, there is provided an agricultural tractor comprising at least one lifting device and at least two power driven front wheels steerable about an upwardly extending axis, said axis being located between the front wheels.

The moving of a tractor constructed in accordance with this aspect of the present invention is improved, whereas the weight of the tractor is distributed over a larger ground surface so that deterioration of the soil structure can be avoided to a considerable extent.

According to a second aspect of the present invention there is provided a tractor having a power driven front wheel which is disposed inside the inner wheel tracks of the rear wheels. In seed bed preparation there can be mounted a tillage machine at the front of the tractor. The tractor wheels running on various tracks will then work the ground by their rolling action further. At the rear of the tractor there can be mounted a drill so that this combination improves the working of the field in one pass.

According to a third aspect of the present invention, there is provided an agricultural tractor comprising a lifting device having three coupling points for implements, the lifting device being hydraulically displaceable upwardly and downwardly along a straight guide.

According to a fourth aspect of the present invention, there is provided an agricultural tractor comprising an upwardly and downwardly movable lifting device which is hydraulically displaceable about a non-vertical pivotal axis.

According to a fifth aspect of the present invention, there is provided an agricultural tractor having a driver's cab comprising tapering pillars.

For a better understanding of the present invention and to show how it may be carried into effect, reference will now be made, by way of example, to the accompanying drawings, in which:

BRIEF DESCRIPTION OF THE DRAWINGS

FIG. 2 is a plan view of the tractor of FIG. 1;

DESCRIPTION OF THE PREFERRED EMBODIMENT

Figure 1:
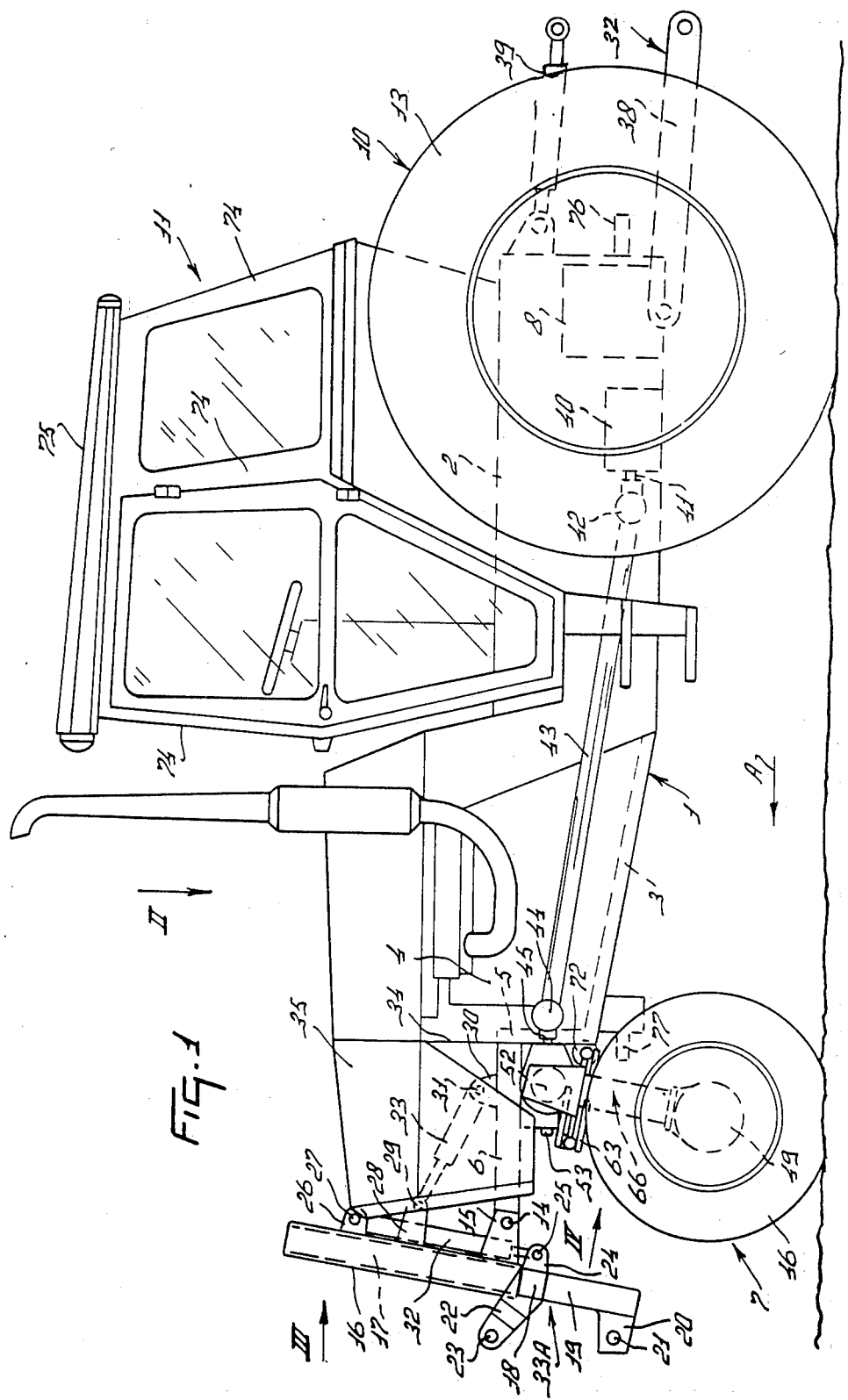
FIG. 1 wherein the front panel and other parts of the tractor are broken off to show the front wheels is a side view (in the direction of arrow II) of a tractor.

The tractor shown in the Figures comprises a frame or chassis 1 provided with a gear box 2, to the front of which is rigidly secured a carrier 3 which slopes forwardly and upwardly from the front lower region of the gear box 2. The carrier 3 supports at the top a driving engine 4 having a power of seventy-five kilowatts or more. An output shaft projects from the rear of the engine 4 and also constitutes an input shaft in the gearbox inside the housing 2. A substantially vertical support 5 is fastened at the front of the carrier 3, and near the top of this support there is a horizontal carrying beam 6 which extends forwardly with respect to the intended direction of normal forwardly travel of the tractor, as indicated by an arrow A. As shown in FIG. 1, the beam 6 is situated above front wheels 7 of the tractor, which are provided with pneumatic tires. The front end of the carrying beam 6, as shown in FIG. 1, lies approximately in a vertical plane which is tangential to the leading points of the front wheels 7. At the rear of the frame 1, on both sides of the gear box 2, there are differential housings 8, in which are journalled two rear axles of driven rear wheels 10, projecting on both sides of the housing.

Above the gear box 2 and extending partly above the rear wheels 10, there is a driver's cab 11 which is resiliently mounted on the housing 2. As seen in FIG. 1, a rear part of the cab 11 is situated above the formost half of the rear wheels 10 and the front of the cab 11 extends approximately up to a position midway between the rotary axes of the front wheels 7 and those of the rear wheels 10.

The rear wheels 10 of the tractor are, like the front wheels 7, provided with pneumatic tires. There are two rear wheels 10 on each side of the tractor, comprising inner rear wheels 12 and outer rear wheels 13, which are rotatable about the same rotary axis and can be driven by the engine 4. The rear wheels 12 and 13 have a diameter of about one hundred, eighty centimeters and the width of the penumatic tires measured in parallel to the rotary axis, is about forty centimeters, and the distance between the central planes of the inner rear wheels 12 is about one hundred, fifty centimeters.

Viewed on plan the cab extends widthwise to near the outer boundaries of the two inner rear wheels 12. In FIG. 2 it can be seen that the width of the gear box 2 is about twenty percent of the distance between the central planes of the inner rear wheels 12 and the width of the engine carrying frame is about forty percent of the distance between the central planes of the inner rear wheels 12 so that the frame and its superstructure, apart from the cab 11, is relatively narrow with respect to the overall width of the tractor, which is about three hundred centimeters. As shown in FIG. 1, there is a gap between the front lower part of the cab and the panel covering of the engine 4. The bottom of the cab, apart from the resilient support mentioned above, does not directly contact the rear part 2 of the frame 1.

On both sides of the front end of the horizontal carrying beam 6 there are horizontal pins 14 which extends transversely of the direction A and are fastened to the carrying beam 6. Lugs 15 are pivotable about these pins 14, these lugs being rigidly secured at the front to an upwardly extending, hollow carrying beam 16 having an internal rectangular or square cross-section. The carrying beam 16 is, therefore, pivotable about the pins 14. A straight supporting beam 17 extends into the carrying beam 16 from the underside and corresponds to the interior shape of the carrying beam 16. The beam 17 is axially displaceable in the carrying beam 16 and projects from the underside of the carrying beam 16, the projecting part being rigidly fixed to a horizontal carrier 18 which extends transversely of the direction A and is symmetrical with respect to the vertical longitudinal central plane of the tractor. The carrying beam 16 is also symmetrical with respect to this plane. The carrier 18 extends laterally to both sides of the beam 17 to positions beyond the frame 1 (FIG. 3) and is provided at both its free ends with downwardly extending, parallel beams 19, which are thus located on both sides of and at equal distances from the vertical longitudinal central plane of the tractor. The beams 19 extend downwards from the carrier 18 for a distance which is approximately half the overall length of the carrier 18 or more. Near the lower end of each of the beams 19 there is a pair of lugs 20 having fastening holes 21. The centerlines of the two pairs of fastening holes 21 are aligned and extend horizontally and transversely of the direction A. Midway along the length of the carrier 18, near the place where it is connected to the upwardly extending supporting beam 17, there is a pair of lugs 22 which are fastened to the carrier 18 and which project forwardly like the lugs 21 and have fastening holes 23, the centerlines of which are aligned and extend parallel to those of the holes 21. Near the lugs 22 at the front of the carrier 18 there is a pair of rearwardly projecting lugs 24 which are fastened to the carrier 18, and which also have fastening holes 25, the centrelines of which are aligned and extend parallel to those of the holes 21.

At a short distance from the top of the carrying beam 16, on its rear side, there are rearwardly projecting lugs 26 having fastening holes 27. A short distance below these lugs 26 there is a further pair of rearwardly projecting lugs 28 having fastening holes 29. The centerlines of the fastening holes 27 and 29 respectively are again aligned and parallel to those of the holes 21. Finally the top of the horizontal carrying beam 6 is provided at a position a short distance behind the upwardly extending carrying beam 16 with a pair of lugs 30 having fastening holes 31, the centerlines of which are again aligned and parallel to those of the holes 21. The lugs 26, 28, 30 are located a short distance from and on both sides of the vertical central plane of the tractor.

The fastening holes of the lugs 26 receive pins which pivotally connect one end of a hydraulic ram 32 to the carrying beam 16. The piston rod of the ram 32 is fastened at its lowermost free end by means of pins in the fastening holes 25 to the lugs 24 and hence to the carrier 18 and the supporting beam 17 located in the carrying beam 16. The fastening holes 31 of the lugs 30 receive pins which pivotally connect one end of a hydraulic ram 33 to the carrying beam 6. The free end of the piston rod of the ram 33 projects forwardly and is fastened to the lugs 28 and hence to the carrying beam 16. The centerline of the hydraulic ram 33 is located approximately in the vertical longitudinal central plane of the tractor, as is that of the ram 32. The lugs 20 and 22 with their fastening holes 21 and 23 projecting forwardly away from the beams 19 and the carrier 18 constitute the fastening points of a three-point lifting device 33A of the tractor, by means of which machines and tools can be attached to the tractor.

The engine 4 of the tractor and the accessories directly connected to it are located behind a vertical plane 34 which extends transversely of the direction A and, as seen in FIG. 1, is disposed behind the rotary axes of the front wheels 7 but in front of the hindmost point fo the front wheels. The plane 34 substantially coincides with the hindmost end of the carrying beam 6. The space in front of the plane 34 and inside a cover panel 35 which adjoins the engine cover accommodates the lugs 30 and the ram 31, and possibly also, depending upon the position of the lifting device 33A, part of the suspension gear of the lifting device. For this purpose the cover panel 35 has an elongate recess or opening 36 arranged symmetrically about the vertical central plane of the tractor. The width of the recess or opening 36 is such that at least part of the carrying beam 16 and of the lugs 26 and 28 can be located within it. This opening or recess 36 divides the front part of the superstructure of the tractor into two parts.

The hydraulic rams 32 and 33 can be actuated from a driver's seat in the cab 11. In the position shown, the carrying beam 16 and the supporting beam 17 slope to the rear from bottom to top. This inclination may be varied by actuating the hydraulic ram 33 so that the beams 16 and 17, the carrier 18 which is rigidly fastened to the supporting beam 17 and the beams 19 are pivotable with respect to the frame 1 about the pins 14 and are fixable in different positions.

By actuating the hydraulic ram 32, the supporting beam 17 located in the carrying beam 16 can be moved axially up and down relatively to the carrying beam 16 for setting the height above the ground of the fastening holes or coupling points 21 and 23 of the lifting device 33A for coupling and driving machines. The displaceable part of the lifting device 33 comprising the supporting beam 17, the carrier 18 and the beams 18 is shown in FIG. 1 in its uppermost position. An upwardly extending plane containing the centerlines of the holes 21 and 23 can thus be put into different inclined positions or into a perpendicular position with respect to the ground and fixed in those positions using the ram 33. Further positions are obtainable in which, as viewed in FIG. 1, the plane containing the centerlines of the holes 21 and 23 slopes forwardly from bottom to top.

It is, of course, possible as an alternative to form the guide 16 of the lifting device 33 from two parts, in which case the carrying beam or guide beam 16 is a double beam so that as seen from the front (FIG. 3) the two guide beams 16 are located symmetrically one on each side of the vertical longitudinal central plane of the tractor and, in this view, for example, directly above the beam 19. The carrier 18 would still be present to connect the beams 19 rigidly. In this case the beams 16, 17 may have a circular section.

The telescopically slidable lifting device 33A is arranged in this embodiment at the front of the tractor. It is, of course, also possible to arrange a similar lifting device, i.e. a device which is telescopically slidable in a straight guide, at the rear of the tractor. However, in the illustrated embodiment, a conventional lifting device 37 is provided at the rear, this device having two hydraulically pivotable lower arms 38 located one on each side of the vertical central plane and an upper arm or top rod 39 located in the central plane, the length of the top rod 39 being adjustable.

By constructing the lifting device 33A in the manner described above, it can be made very short in the lengthwise direction of the tractor. Also, an additional degree of freedom is provided for the lifting device. The maximum possible lifting height is greater than that of a known lifting device and the ground pressure of an attached machine is adjustable.

On one side of the gear box 2 there is a housing 40 which accommodates a gear wheel transmission. An output shaft 41 projects forwardly from the housing and is connected to a universal joint 42, which connects the output shaft to a forwardly extending auxiliary shaft 43. The shaft 43 is connected by a universal joint 44 to an input shaft 45 for driving the front wheels 7 from the engine 4.

The front wheel support of the tractor comprises two drivable steerable front wheel units 7 one on each side of the vertical central plane. Each front wheel, unit 7 comprises two wheels 46 and 47, the diameter of which is about ninety centimeters. The outboard front wheel 46 is located approximately in the same track as the inner rear wheel 12 on the same side of the tractor. The inboard front wheels 47 are located inside the track of the inner rear wheels 12. In the illustrated embodiment, the outermost boundary of the inboard front wheel 47 coincides with the inner boundary of the inner rear wheel 12 on the same side. As seen in the front view of FIG. 3, about eighty percent of the width of the tractor comprises wheels so that the weight of the tractor is distributed among more than four wheel tracks and deterioration of the ground structure is significantly reduced. As seen in the front view all front wheels may, of course, be arranged within the inner boundary of the inner rear wheels 12 so there are eight wheel tracks across the tractors width.

Figure 4:
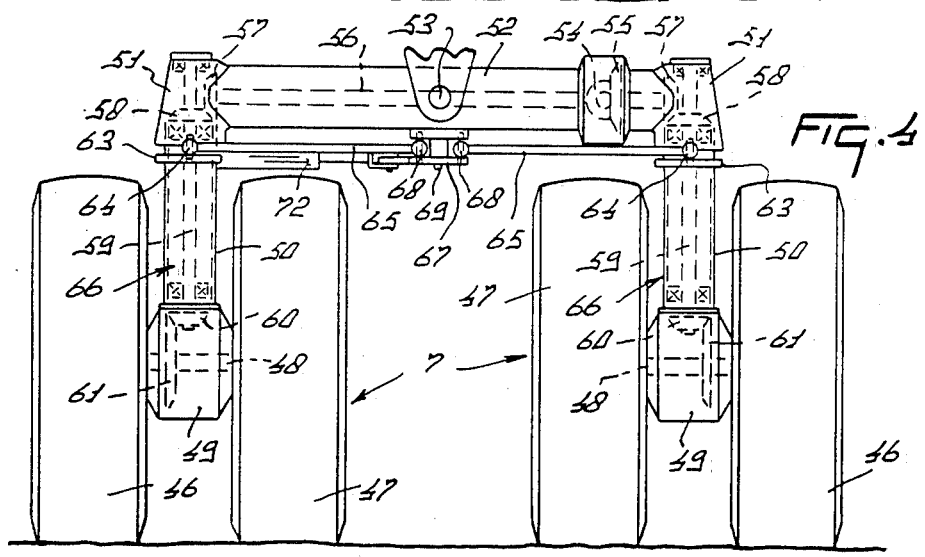
FIG. 4 is a fragmentary view which shows the disposition of the front wheels taken in the direction of the arrow IV in FIG. 1.

The width of each front wheel 46, 47, measured along its rotary axis, may be equal to that of one of the driven rear wheels 12 or 13 or it may be smaller. The front wheels of each unit 7 can be driven by a common drive shaft 48 (FIG. 4) which is journalled inside a housing 49. The housing 49 is rigidly secured to a tubular wheel carrier 50 which extends upwardly away from the wheel housing 49. The centerline of the wheel carrier 50 is midway between the two wheels 46 and 47 of the unit 7. At the top, each wheel carrier 50 is journalled in a housing 51 by means of a shaft 59 in spaced bearings. The shaft 59 is accommodated within the wheel carrier and drives the wheels. The housing 51 is rigidly secured to the outer end of a front axle 52, which extends transversely of the direction A. Midway along its length, the front axle 52 is pivotally mounted for movement about a substantially horizontal pivotal axis 53 located in the vertical longitudinal central plane of the tractor. The axis 53 is embodied by pins fastened to the front and rear sides of the front axle, and are pivotally located in lugs fastened to the underside of the carrying beam 6 of the frame 1. The suspension construction of the front wheels shown in FIG. 4 is symmetrical about the vertical longitudinal central plane of the tractor with the exception of the input of the drive shaft of the front wheels, which is located on one side of the plane of symmetry and is located approximately directly above one of the inner front wheels 47.

The horizontal input shaft 45 extending in the direction A is provided with a bevel gear wheel 54 which is in mesh with a further bevel gear wheel 55 fastened to a driving shaft 56, which is coaxial with the tubular front axle 52. At each end of the front axle 52 the drive shaft 56 is provided with a bevel gear wheel 57 which is in mesh with a bevel gear wheel 58 fastened to the respective shaft 59 which is coaxial with the surrounding wheel carrier 50, the shaft 59 terminating at its lower end inside the associated wheel housing 49. The end of each shaft 59 lying in the wheel housing is provided with a bevel gear wheel 60 which meshes with a bevel gear 61 on axle 48 which projects on both sides from the wheel housing 49 and carrying the front wheels 46 and 47 on its projecting ends.

Figure 3:
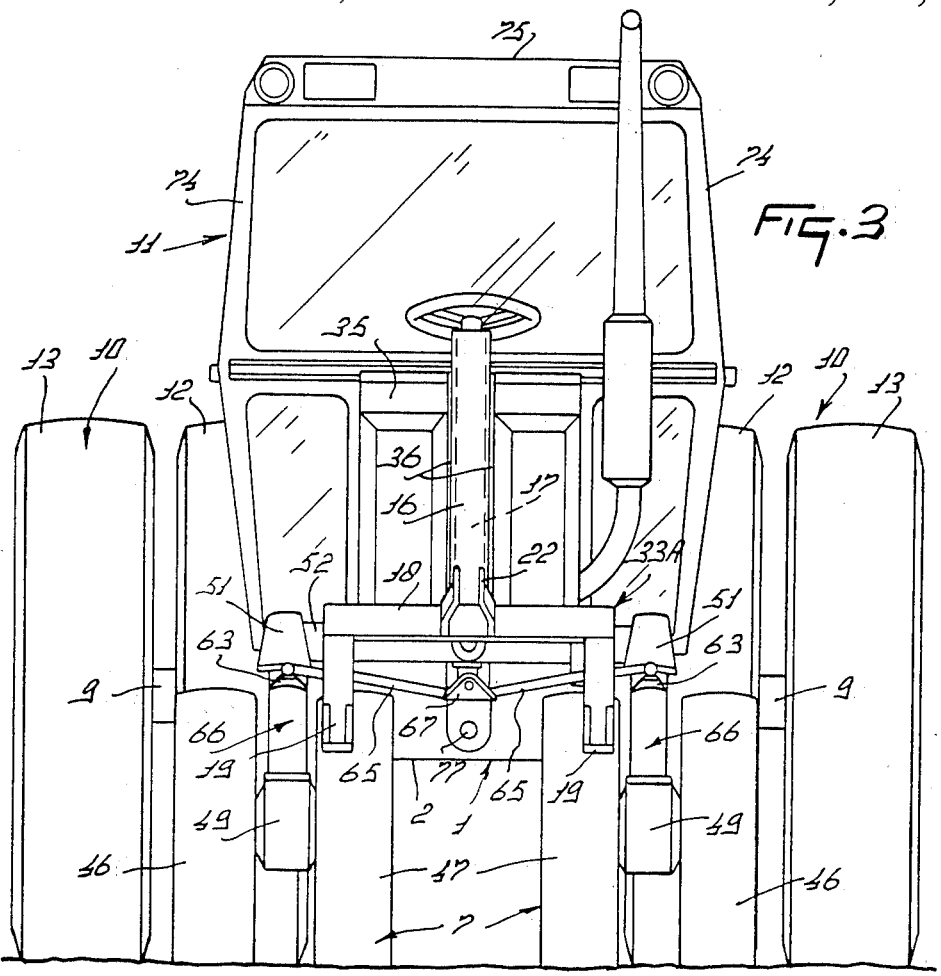
FIG. 3 is a front view taken in the direction of the arrow III in FIG. 1.

Each downwardly extending wheel carrier 50 is pivotable about its center line and axis of symmetry with respect to the rigid supporting construction formed by the housings 51 and the front axle 52. At a region directly below the associated housing 51, at the top of each wheel carrier 50, there is fastened a forwardly projecting lever 63 (FIGS. 3 and 4). A pin 64 is fitted at the front end of each lever 63, this pin 64 extending parallel to the centerline of the wheel carrier. A track rod 65 is pivotable about the pin 64 (see also FIG. 2 in which the wheel carriers 50 serve as king pins designated by reference numeral 66).

In the straight-ahead position of the front wheels, each of the two track rods 65 slopes inwardly and to the rear from its pin 64. At their inner ends, the track rods 65 are fastened to the rear of a generally triangular intermediate lever 67 which, in the straight-ahead position, is symmetrical about the vertical longitudinal central plane of the tractor. The track rods 65 are each fastened to the intermediate lever 67 by respective pins 68. The front corner of the intermediate lever 67 receives a pivotal shaft 69 which is fastened to the underside of the front axle 52 and is located in the vertical longitudinal central plane of the tractor. One of the two wheel carriers is provided with a rearwardly directed lever arm 70, to which the end of a hydraulic steering cylinder 72 is fastened for pivotable movement about a pin 71. The piston rod of the cylinder 72 is pivotally connected by a pin 73 to the rear of the intermediate lever 67 at a region near one of the pins 68. The pins or pivotal shafts 64, 68, 69, 71 and 73 are all parallel to one another and to the centerline of the two wheel carriers 50. When in the position corresponding to straight ahead travel of the tractor (FIG. 2, solid lines) the centerline of the pivotal shaft 69 is approximately on a line extending between the two pins 64 located one on each side of the central plane of the tractor. Each track rod 65 intersects a plane containing the centerline of the wheel carriers 50 (king pins 66).

As seen in the side view of FIG. 1, the plane containing the centerline of the two wheel carriers 50 is positioned such that a line of intersection between that plane and a horizontal plane intersects the vertical central longitudinal plane of the tractor at right angles. The angle between that plane and the horizontal is, in the illustrated embodiment, about eighty degrees, but can be any angle within the range sixty degrees to eight-five degrees. The centerline of the wheel carriers 50 slope to the rear from bottom to top.

In operation, the rear wheels 12, 13 are driven from the output shaft of the engine 4, through the gear box in the housing 2 and the differential inside the housings 8, and the rear axles 9. At the same time the forwardly projecting output shaft 41 is driven through the gear box 2 this shaft driving the input shaft 45 through the universal couplings 42 and 44 and the auxiliary shaft 43. The input shaft 41 drives the two pairs of front wheels through the gear wheel sets 54 and 55, 57 and 58 and 60 and 61. The drive shaft 56 couples the drives of the two sets of front wheels. The entire front axle construction shown in FIG. 4 is pivotable with respect to the frame 1 about the pivotal shaft 53. The transmission ratios of the gear wheel transmission 40 and of the gear wheels in the front axle construction are such that the peripheral speed of the driven front wheels is equal to that of the driven rear wheels 10.

From the cab 10, the driver can actuate the hydraulic steering cylinder 72 so that its piston rod can cause the intermediate lever 67 to turn from its medium position shown in FIG. 2 to one side or the other about the pivotal shaft 69. The construction described above enables at least one pair of front wheels to be turned from their straight-ahead position through an angle of about ninety degrees in one direction about the swivel pin 66 and also through an angle of about ninety degrees in the other direction. The front wheels can thus turn through an overall angle of one hundred, twenty-five degrees or more. Preferably the angle is between about one hundred, forty degrees and one hundred, eighty degrees. As a result of this, the tractor is readily maneouverable under difficult conditions, since the vertical axis about which the tractor as a whole can turn is located inside the boundary of the tractor itself. This has the advantage that the tractor with attached tools requires a considerably smaller space at the edge of a field to change its direction through 180° so that unused edge portions may be considerably smaller and the useful part of the agricultural field is larger, Since the swivel shaft 66 is at an acute angle to the horizontal plane, one of the two wheels of each set of front wheels will lift off the ground when each set of front wheels is turned through 90° from its straight-ahead position, and in such position this wheel can be readily removed or replaced. The large angular turn of each set of front wheels is made possible in particular by using a divided track rod comprising the two rods 65, the center lines of which intersect the line connecting the two swivel shafts.

All movements of the front lifting device 33A provided with the straight guide, of the normal lifting device 37 at the rear and of the front wheels can be controlled from the driver's cab. The driver's cab is provided with upwardly directed pillars 74 which support a roof 75 of the cab. These pillars are narrower at their top ends or have a smaller cross section than they have at lower places, and have a larger cross-section in the middle of their length then they have at lower places. Two opposite sides of the cab 11 diverge downwardly from the roof 75 to about half way down the full height of the cab, after which they converge downwardly. With the variation of the cross-section of the pillars mentioned above, this design provides the greatest strength for the same material used in the case of horizontal and vertical loads on the cab.

The tractor is provided with a rear power take-off shaft 76 located near the rear lifting device 37 and a front power take-off shaft 77 arranged below the frame, these shafts being driven by the engine 4 with speeds of rotation which are proportional to the engine speed. An auxiliary shaft (not shown) connected to the front power take-off shaft for driving machines attached to the lifting device 33A has sufficient passage through the lifting assembly formed by the beams 18 and 19 having the shape of an inverted U so that the auxiliary shaft can occupy inclined positions when driving the attached tool.

Although various features of the tractor described and illustrated in will be set forth in the following claims as inventive features, the invention is not necessarily limited to these features and may encompasses all patentably novel features which have been disclosed both individually and in various combinations.

Having disclosed my invention, what I claim as new and to be secured by Letters Patent of the United States is:

1. Agricultural tractor for operating at least a tillage machine for seed bed preparation, said machine being connected to a three-point lifting device of the tractor, said lifting device comprising:
   a hitching frame extending transverse to the tractor's plane of symmetry, said hitching frame having three coupling points, the lower two of said points being at the same level and below as seen in side elevation an upper of said points;
   upstanding beam means rigidly connected at its lower end to the upper aspect of said hitching frame;
   guiding beam means which surrounds at least in part said upstanding beam means so that said upstanding beam means is movable both upwardly and downwardly in said guiding beam means, said guiding beam means being in all positions completely spaced higher than said lower coupling points;
   said guiding beam means being pivotally connected to the remaining part of the tractor by pivot means;
   first hydraulic jack means between said guiding beam means and said hitching frame for moving the latter relatively to the former upwardly and downwardly; and
   second hydraulic jack means connected with said guiding means at a location relative to said pivot means so that on actuation said lower two points move fore and aft at approximately the same level relative to the remaining part of the tractor in an arcuate path, said level being determined by said first hydraulic jack means;
   said first and second hydraulic jack means having control means which can be reached by the tractor's operator from the tractor's driver's seat.

2. A tractor as claimed in claim 1, in which said lifting device is provided forward of the tractor's front wheels, said wheel each adapted to turn on upright axis through about one hundred and eighty degrees, said guiding beam means comprising a straight guide for said lifting device, said lifting device being hydraulically displaceable upwardly and downwardly along said straight guide.

3. An agricultural tractor as claimed in claim 1 wherein said guiding beam means comprises a straight guide for said lifting device, said lifting device being hydraulically displaceable upwardly and downwardly along and parallel to said straight guide.

4. A tractor as claimed in claim 3, in which said three coupling points are fixed relative to each other.

5. A tractor as claimed in claim 4 comprising adjustment means, the position of said straight guide with respect to the tractor frame being adjustable by said adjustment means.

6. A tractor as claimed in claim 5 wherein said adjustment means comprise said second hydraulic jack means, said lifting device being hydraulically displaceable about a non-vertical pivotal axis by said hydraulic means.

7. An agricultural tractor as claimed in claim 1 wherein said three-point lifting device is movable rectilinearly upwardly and downwardly as a lifting unit, said first hydraulic jack means hydraulically displacing said lifting unit about a non-vertical pivotal axis.

8. A tractor as claimed in claim 7, in which said pivotal axis is substantially horizontal and extends normally to the tractor's vertical longitudinal central plane.

9. A tractor as claimed in claim 8 wherein said guiding beam means comprises a straight guide for said lifting unit which comprises at least one set of relatively telescopically slidable tubes.

10. A tractor as claimed in claim 9, in which said tubes have a rectangular section.

11. A tractor as claimed in claim 9, in which said tubes have a circular section.

12. A tractor as claimed in claim 9, in which, as viewed from the side, said straight guide is inclined upwardly and to the rear.

13. A tractor as claimed in claim 9, in which a further straight guide is movable within a recess provided in the tractor's front end.

14. A tractor as claimed in claim 9 in which the tractor's front end comprises two parts which are spaced apart to provide a recess.

15. A tractor as claimed in claim 9, wherein said lifting unit comprises said coupling points which are relatively fixed and displaceable in a plurality of positions along said straight guide by means of said first hydraulic jack means.

16. A tractor as claimed in claim 15, in which said first hydraulic jack means extends along said straight guide.

17. A tractor as claimed in claim 15 in which as viewed in a direction parallel to the longitudinal central plane of the tractor, said coupling points are arranged on a lifting frame included in said hitching frame having the shape of an inverted U.

18. A tractor as claimed in claim 17, in which as viewed in a direction parallel to the longitudinal central plane of the tractor, a power take-off shaft which is drivable by the tractor's engine is located inside said U-shaped lifting frame.

19. A tractor as claimed in claim 1, in which said lifting device is arranged at the front of the tractor near the tractor's engine, said lower two points extending tranversely outboard of said engine and its compartment where they are visible by the tractor's operator.

20. A tractor as claimed in claim 19, in which a further lifting device is arranged at the tractor's rear.

* * * * *